United States Patent [19]

Kin

[11] Patent Number: 5,316,423
[45] Date of Patent: May 31, 1994

[54] ACOUSTIC ISOLATION FASTENER AND METHOD FOR ATTACHMENT

[76] Inventor: Daniel C. C. Kin, No. 1 1/F Shatin Wai Village, Shatin N.T., Hong Kong

[21] Appl. No.: 989,199

[22] Filed: Dec. 11, 1992

[51] Int. Cl.$^5$ .................... F16B 19/00; F16B 21/00
[52] U.S. Cl. .................... 411/510; 411/339; 411/907; 411/913
[58] Field of Search ............... 411/338, 339, 508–510, 411/913, 907; 24/297

[56] References Cited

U.S. PATENT DOCUMENTS

| | | | |
|---|---|---|---|
| D. 268,006 | 2/1983 | Wollar | D8/393 |
| D. 293,880 | 1/1988 | Takahashi | 24/297 X |
| 2,951,674 | 9/1960 | Rice | 411/510 X |
| 3,093,027 | 6/1963 | Rapata | 411/508 |
| 3,115,225 | 12/1963 | Fraylick et al. | 24/297 |
| 3,238,835 | 3/1966 | Rosenberg . | |
| 3,319,918 | 5/1967 | Rapata | 411/510 X |
| 4,286,642 | 9/1981 | Keatley | 411/112 |
| 4,375,342 | 3/1983 | Wollar et al. | 411/41 |
| 4,405,272 | 9/1983 | Wollar | 411/41 |
| 4,457,050 | 7/1984 | Kanzaka | 411/510 X |
| 4,522,378 | 6/1985 | Nelson | 267/141.4 |
| 4,557,653 | 12/1985 | Hill | 411/509 X |
| 4,568,243 | 2/1986 | Schubert et al. | 415/213 |
| 4,610,587 | 9/1986 | Wollar et al. | 411/60 |
| 4,726,722 | 2/1988 | Wollar | 24/297 X |
| 4,784,550 | 11/1988 | Wollar | 411/32 |
| 4,807,718 | 2/1989 | Lotz | 181/202 |

Primary Examiner—Neill R. Wilson
Attorney, Agent, or Firm—McCubbrey, Bartels & Ward

[57] ABSTRACT

A fastener is disclosed for attaching first and second members. The fastener includes a longitudinal shaft portion having first and second segments each having a cross-sectional shape substantially conforming to the peripheral shape of first and second openings formed in the respective members. The longitudinal length of each segment substantially conforms to the depth of said first and second openings. A cap member is formed at a first end of the shaft portion adjacent and outside the first segment. The cap member is larger than the periphery of the first opening. A spacer member is formed on the shaft portion between the first and second segments. This spacer member has an outer periphery larger than the first and second openings to inhibit passage therethrough so as to secure the first member on the first segment of the shaft portion between the cap member and the spacer member. The fastener also includes an abutment member positioned on the second end of the shaft portion outside of the second segment. The abutment member has an outer periphery larger than the second opening to inhibit passage of the abutment member therethrough, thereby securing the second member on the second segment of the shaft portion of the fastener. The spacer member and abutment member each have at least one slot formed therein to permit circumferential compression so as to allow passage of the spacer member and the abutment member through the first and second openings, respectively.

15 Claims, 3 Drawing Sheets

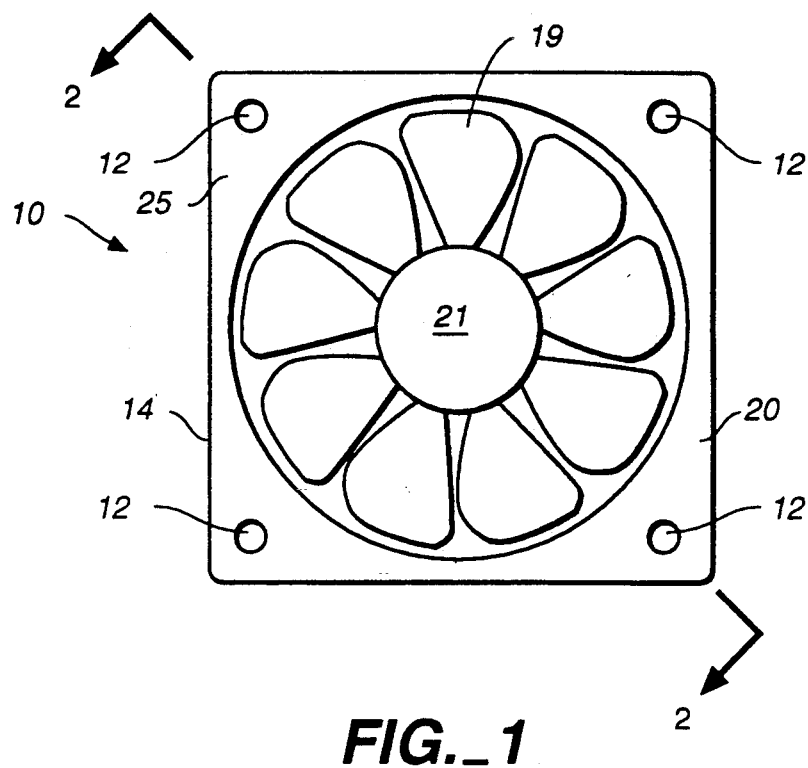
FIG._1
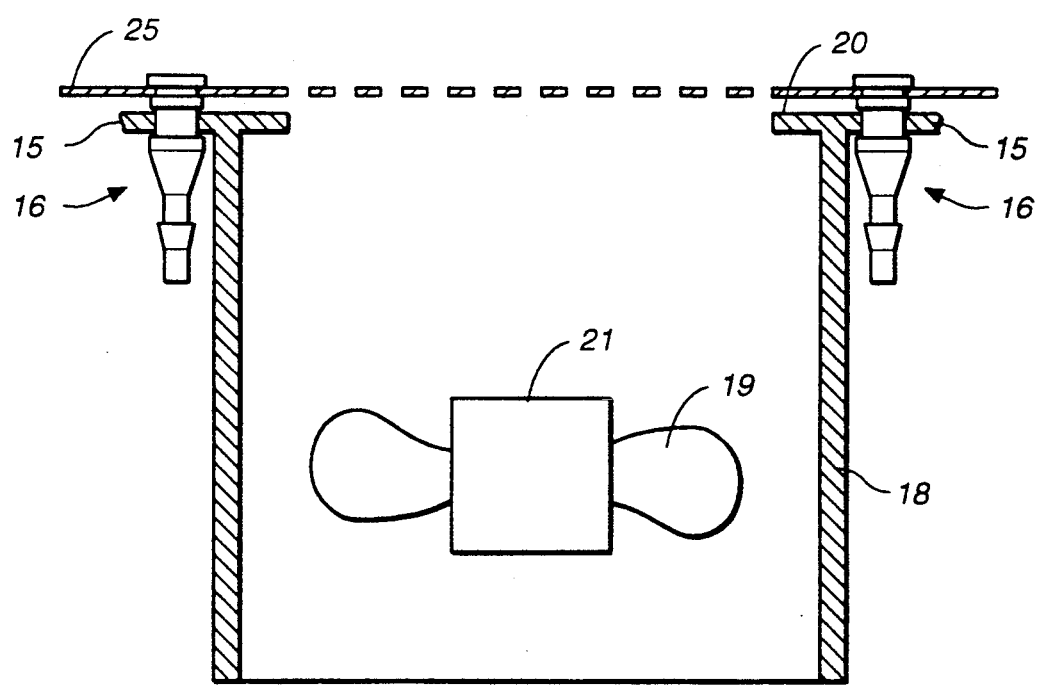
FIG._2

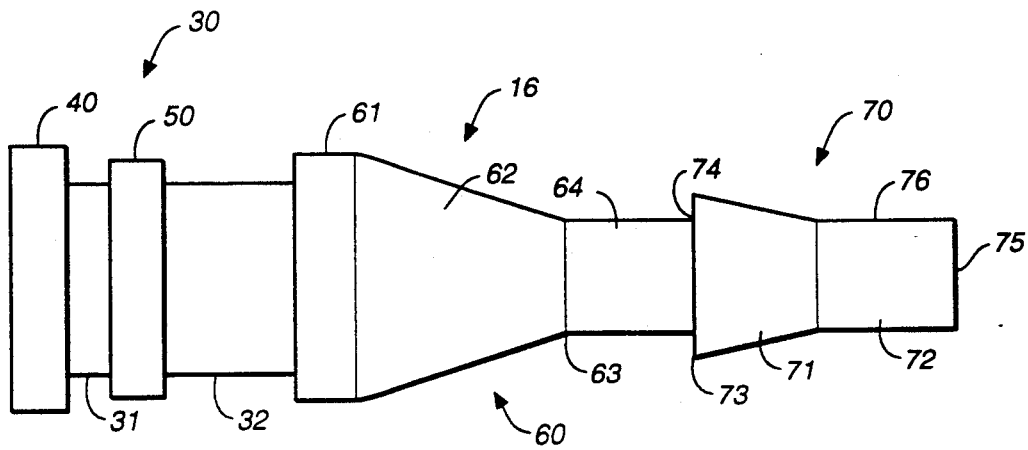
FIG._3
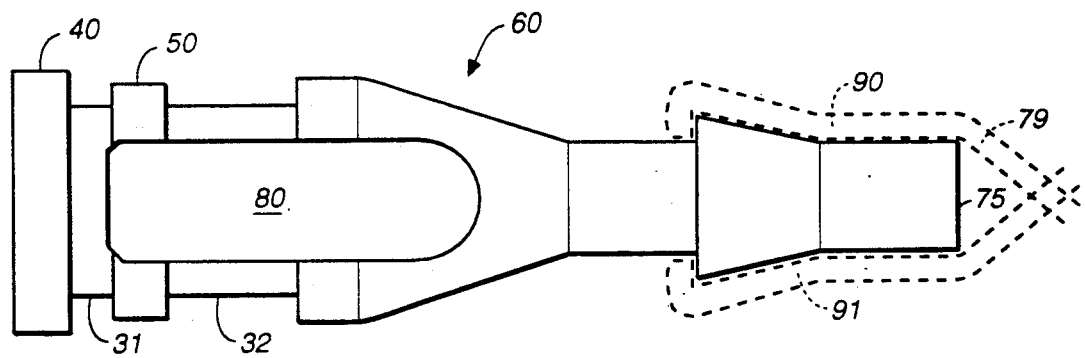
FIG._4
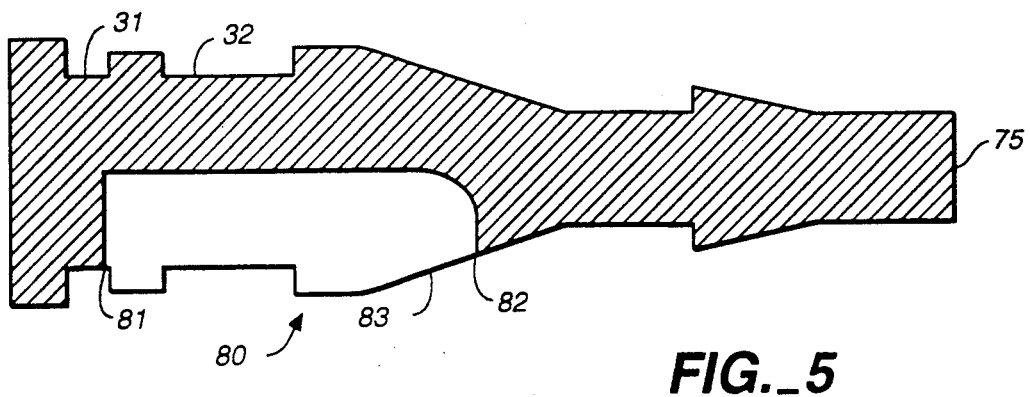
FIG._5

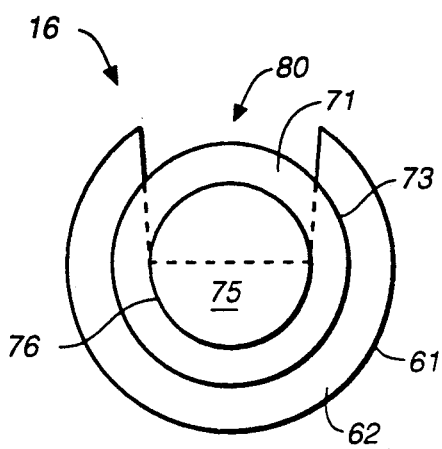
FIG._6
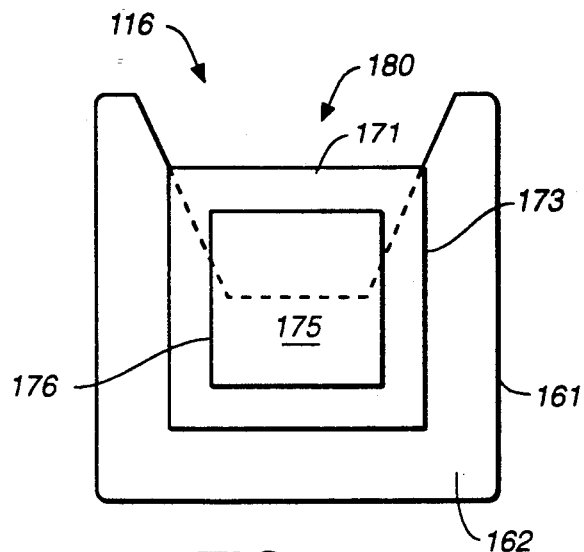
FIG._7
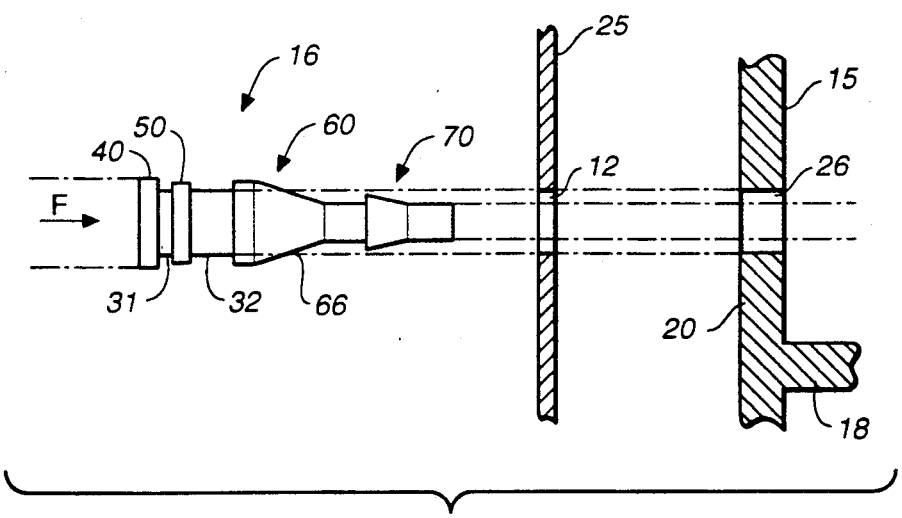
FIG._8

ACOUSTIC ISOLATION FASTENER AND METHOD FOR ATTACHMENT

FIELD OF THE INVENTION

The present invention relates generally to noise control apparatus and, more particularly, to a resilient one-piece acoustic isolation fastener for attaching a fan having a case surrounding a rotating blade assembly to a support structure and to a method for attaching a fan having a case surrounding a rotating blade assembly to a support structure.

BACKGROUND OF THE INVENTION

It is well known to persons of ordinary skill in the art that electrical components and devices, by their operation, generate heat and are, by their nature, susceptible to damage by the elevated temperatures. Frequently, specific devices are provided with heat sinks, such as heat-conductive fins, to remove unwanted heat by radiation, conduction and convection to the environment.

Space limitations in the drive towards miniaturization have resulted in smaller space allowances for electronic components used in, for example, data processing equipment and peripherals, especially desk top and portable units. The electronic equipment is typically packaged in a cabinet or enclosure which protects the devices but frequently provides minimal room within for convection cooling. To provide air circulation, the cabinets, an arrangement known as "hard-mounting." The fans are generally known as "muffin fans" and typically comprise a propeller rotatably mounted within a frame on a hub containing the prime mover. Holes are typically disposed in the four corners of the frame for receiving bolts which secure the fan to a panel on the cabinet.

Hard-mounting can result in the vibrational excitation of the cabinet at one-per-revolution and blade-pass frequencies, and their respective harmonics, of the fan during operation as well as at the power line frequency and its harmonics. This structure-borne component of noise can be most undesirable for particular locations, such as when the electronic cabinets are within an office, and especially when several such fans are operating. Naturally, it is desirable to provide work and social environments which are free of unwanted acoustic noise. In normally quiet environments, such as law offices, banks, libraries and such, acoustic noise which emanates from the cooling fans used in computers and other business equipment can be quite annoying.

The noise which emanates from cooling fans originates from two very different causes: mechanical/electromagnetic forces or stresses and aerodynamic forces or pressures. Aerodynamic noises are caused by unsteady airflow in the vicinity of the fan. The unsteadiness results from discreet blades cutting through the air stream, from turbulence caused by sufficiently rapid flow of air over fluid boundaries such as fan rotor, fan case, fan motor, fan struts, and from other causes. Aerodynamic noise originates in the fluid at or near a fluid/solid boundary and is immediately radiated into the surrounding fluid, which is generally air. The sound energy continues to propagate through the fluid, reaching the exterior of the product, either directly (through fluid-borne paths entirely) or indirectly, transmitting through panels, covers, and the like, to the exterior. In the environments under consideration, aerodynamic noise typically is the least important.

Mechanical noise originates in the mechanical vibration of the fan, caused by unsteady electromagnetic forces, unsteady bearing forces, to some degree unsteady electromagnetic forces, unsteady bearing forces, to some degree unsteady aerodynamic forces, and other causes. This vibratory energy propagates through solid structures as audio frequency vibration (also known as structure-borne sound) and is only radiated into the surrounding fluid at fluid/solid interfaces. From there, it travels as fluid-borne sound to the exterior of the product, either directly (through fluid-borne pass entirely) or indirectly, transmitting through panels, covers, and the like to the exterior. In the absence of damping or vibration isolation, the mechanically or electromagnetically induced vibration propagates from its origin (in the fan) throughout the fan and to the supporting structure. A large area is energized by the vibration and, consequently, a large area radiates sound in the manner of a sounding or resonating board.

Mechanically induced noise from cooling fans used in computer and business equipment is generally controlled by isolating the fan vibrationally from its supporting structure. A typical prior art device is shown and described in U.S. Pat. No. 4,807,718 to Lotz, entitled "Acoustic Noise Control For Fans." As shown and described in Lotz, a standard muffin fan as commonly used for cooling in electronic equipment has mounting holes through which bolts are passed. The bolts, in turn, pass through rubber isolation grommets in the mounting hole surrounding a cooling opening in the side of the equipment case to be fastened by nuts. The rubber grommet fits within the mounting hole and includes flanged portions which extend above and below the equipment case so as to isolate the fan vibrationally from its support structure and the bolt from the fan case and thus reduces unwanted mechanically induced noise. Other prior art systems are also described in Lotz.

The use of cylindrical isolators (such as grommets) to reduce mechanically induced noise is widely accepted in the electronics industry. However, the use of the cylindrical isolators also requires the use of bolts which must pass through the fan case, the isolators, and the support structure or cabinet panel where they are ultimately fastened by nuts, resulting in numerous and complicated manufacturing steps. This manufacturing process often proves costly and cumbersome.

It is therefore a general object of the present invention to provide an acoustic isolation fastener which provides a reduction in mechanically induced noise and a method for attaching planar members using such a fastener which is simple and cost effective.

Another object of the present invention is to provide a resilient one-piece acoustic isolation fastener which can be used to fasten a device, such as a fan or a blower, to a surface on which the device is mounted.

A further object of the invention is to provide a resilient one-piece acoustic isolation fastener which can be used to fasten a small cooling device, such as a muffin fan, to a support surface, without the need for separate mounting bolts.

A still further object of the invention is to provide a method for attaching a device, such as a fan or blower, to a surface which is simple and cost-effective.

SUMMARY OF THE INVENTION

The present invention provides a new and novel fastener for attaching first and second substantially planar members in substantially parallel juxtaposition and a method for attaching first and second substantially planar members in substantially parallel juxtaposition by means of a fastener.

Accordingly, one aspect of the present invention is drawn to a fastener for attaching first and second substantially planar members in substantially parallel juxtaposition at substantially aligned first and second openings in the respective planar members to provide acoustic isolation between the planar members, each opening having a predefined depth and peripheral shape. The fastener comprises a longitudinal shaft portion having first and second segments each having a cross-sectional shape substantially conforming to the peripheral shape of the first and second openings, respectively, and each having a longitudinal length substantially conforming to the depth of the first and second openings, respectively.

A cap member is integrally disposed longitudinally at a first end of the shaft portion adjacent and outside of the first segment. The cap member has an outer periphery larger than the first opening to inhibit passage of the cap member therethrough. A spacer member is provided positioned longitudinally on the shaft portion between the first and second segments thereof. The spacer member has an outer periphery larger than the first and second openings to inhibit passage therethrough so as to secure the first planar member on the first segment of the shaft portion between the cap member and the spacer member and to space the first and second planar members a predetermined distance from each other corresponding to the longitudinal dimension of the spacer member.

The fastener also includes an abutment member positioned longitudinally on a second end of the shaft portion adjacent and outside of the second segment. The abutment member has an outer periphery larger than the second opening to inhibit passage of the abutment member therethrough so as to secure the second planar member on the second segment of the shaft portion between the cap member and the abutment member. The spacer member and the abutment member each have at least one slot therein to permit circumferential compression so as to allow passage of the spacer member and the abutment member through the first and second openings, respectively.

The various features of novelty which characterize the invention are pointed out with particularity in the claims annexed to and forming a part of this disclosure. For a better understanding of the present invention and the advantages attained by its use, reference is made to the accompanying drawings and descriptive matter in which preferred embodiments of the invention are illustrated.

BRIEF DESCRIPTION OF THE DRAWINGS

FIG. 1 is a simplified front schematic view of a muffin fan having mounting holes provided in the case thereof.

FIG. 2 is a partially cut-away side schematic view of the muffin fan of FIG. 1 mounted in substantially parallel juxtaposition to a suitable mounting structure by means of a fastener according to the present invention.

FIG. 3 is a plan view of the fastener of the present invention.

FIG. 4 is a plan view of the fastener of the present invention rotated from the view shown in FIG. 3 to illustrate a slot formed therein.

FIG. 5 is a cut-away view of the fastener of the present invention rotated ninety degrees from the view shown in FIG. 4.

FIG. 6 is an axial view of the fastener of the present invention.

FIG. 7 is an axial view of an alternative embodiment of the fastener of the present invention.

FIG. 8 is a blown apart side view of the fastener of the present invention, the mounting surface, and the fan casing.

DETAILED DESCRIPTION OF THE PREFERRED EMBODIMENT

Referring now to the drawings generally, where like numerals designate the same element throughout the several drawings, and to FIGS. 1 and 2 in particular, there is shown a standard "muffin fan" 10 as commonly used for cooling electronic equipment having mounting holes or openings 12 in fan case 14.

Muffin fan 10 is well known to those of ordinary skill in the art and generally includes a plurality of blades 19 and a prime mover 21. In the preferred embodiment of the present invention, fan case 14 has an integral top plate 20 having flanges 15 through which fasteners 16 are passed to attach fan 10 in substantially parallel juxtaposition to an appropriate substantially planar mounting member, such as mounting plate 25. Fan case 14 also includes an integral cylindrical portion 18 which surrounds the blades 19 of fan 10. Typically, fan 10 will be mounted so that the blades 19 thereof lie in a vertical plane, fasteners 16 being axially aligned in a horizontal plane. Under normal conditions, it has been found desirable to employ the use of four fasteners 16 to attach fan 10 to a mounting plate 25, so as to enable the mounting to withstand the sheer stress caused by the force of gravity pulling the fan 10 downward against fastener 16, as well as the mechanical and aerodynamic forces caused by the operation of fan 10, and to satisfactorily eliminate the mechanical noise discussed above. However, depending upon the size and power of fan 10, the size of fasteners 16, and other desired design parameters, a different number of fasteners may be used within the spirit and scope of the present invention.

Referring now to FIGS. 3, 4 and 5, shown therein is a preferred embodiment of fastener 16. Fastener 16 preferably includes a longitudinal portion generally designated 30 having first and second segments 31 and 32. First segment 31 has a cross-sectional shape which advantageously substantially conforms to the peripheral shape of openings 12 in mounting plate 25, shown in FIGS. 1 and 2. In the preferred embodiment, as can be most clearly seen in FIG. 1, the shape of openings 12 is circular. Correspondingly, the cross-sectional shape of segment 31 is circular in the preferred embodiment, segment 31 therefore forming a cylinder. The longitudinal length of segment 31 advantageously corresponds to the depth of openings 12 of mounting plate 25 as can be best seen in FIG. 2. In a similar manner, longitudinal portion 30 includes a second segment 32 which in the preferred embodiment advantageously forms a cylinder having a longitudinal length which corresponds to the depth of openings 26 of flange 15, as can be best seen in FIGS. 2 and 8, and a circular cross-sectional shape that corresponds to the circular shape of openings 26. Those skilled in the art will recognize that vibration, and therefore mechanically induced acoustic noise, will be optimally reduced when the cross-sectional shape and the length of segments 31 and 32 correspond to the peripheral shape and depth of openings 12 and 26, respectively. However, in less than ideal situations, non-conforming shapes and lengths may be employed within the spirit and scope of the present invention.

Referring still to FIGS. 3-5, a cap member 40 is shown integrally disposed longitudinally at an extreme end of longitudinal portion 30 adjacent and outside of the first segment 31. Cap member 40 has an outer periphery, or circumferential dimension, that is larger than the circumference of opening 12 so that cap member 40 is inhibited from passing through opening 12 as can be best seen in FIG. 2. The shape of cap 40 is not important, so long as its peripheral size inhibits its passage through opening 12. A spacer member 50 is also shown disposed longitudinally on segments 31 and 32. Spacer member 50 has an outer periphery which is sized larger than the outer periphery (or circumference in the preferred embodiment) of opening 12 to inhibit passage therethrough so as to secure plate 25 on first segment 31 between cap member 40 and spacer member 50. The outer periphery of spacer member 50 is also sized larger than opening 26 to inhibit passage therethrough.

Fastener 16 further includes an abutment member 60 positioned on a second end of longitudinal portion 30 adjacent and outside of second segment 32. Abutment member 60 has an outer periphery that is larger than the circumference of opening 26 to inhibit passage therethrough so as to secure top plate 20 of fan 10 on second segment 32 between spacer member 50 and abutment member 60. In the preferred embodiment, abutment member 60 advantageously takes on the form of an annular cone having a relatively wide substantially cylindrical portion 61 which has an outer periphery sized to exceed the circumferential dimension of opening 26 and a tapered portion 62 having its smallest peripheral dimension at intersection 63 where tapered portion 62 meets grip shaft 64.

Those of ordinary skill in the art will recognize that the conical shape of abutment member 60 facilitates deformation of abutment member 60 during installation of fastener 16 as will be described below. Alternatively, however, abutment member 60 may advantageously take on a rectangular-pyramidal shape as shown in FIG. 7, a cylindrical shape substantially similar to spacer member 50 or any other shape suitable to compliment the peripheral shape of spacer member 50 and second segment 32 so as to facilitate installation of fastener 16, as will be described below, and to optionally secure top plate 20 on second segment 32.

Fastener 16 includes means suitable to facilitate engagement with a well known basic plyer-type assembly tool 79 (shown in ghost in FIG. 4), such as grip means generally designated 70. Grip means 70 includes conical portions 71 and grip shaft portion 72 having a generally cylindrical shape. Conical portion 71 has its widest radial dimension at end 73 which interfaces with grip shaft 64 at end 74 thereof, and has its smallest radial dimension, characterized by the radius of cylinder 76 in the preferred embodiment, at end 75. Ends 74 and 75 each advantageously have an outer periphery sized smaller than openings 12 and 26 to allow grip means 70 to pass therethrough in a substantially unimpeded manner during installation of fastener 16.

Referring now particularly to FIGS. 4-6, suitable means to permit adequate circumferential compression of fastener 16 during installation is shown, such as deformation slot 80. Slot 80 advantageously extends in axial alignment with longitudinal shaft portion 30, and radially cuts into at least spacer member 50 and abutment member 60 as best shown in FIG. 4. Those of ordinary skill in the art will recognize that slot 80 may be further radially incorporated into fastener 16, as best shown in FIG. 5 at spacer member 50, second segment 32 and conical portion 62 of abutment member 60, to allow for greater deformation during installation of fastener 16 as will be described below. In the preferred embodiment, slot 80 extends radially into fastener 16 substantially to the axis of fastener 16, and extends longitudinally from point 81 which is found substantially at the interface of segment 31 and spacer member 50, to point 82 on abutment member 60. Slot 80 may be advantageously sized to reduce the overall size of tapered portion 62 by forming a depression 83. Alternate means which permit for circumferential compression of abutment member 60 and spacer member 50 so as to allow passage through openings 12 and 26 are within the spirit and scope of the present invention.

Referring now particularly to FIG. 7, an alternate embodiment of fastener 16 is shown. Fastener 16 has been described hereinabove as being generally cylindrical in shape. As can be seen in FIG. 6, the preferred embodiment of fastener 16 has a substantially circular periphery characterized by cylinder 76 having circular end 75, circular tapered portion 62 and cylindrical wide portion 61 of abutment member 60. The circular peripheral shape of fastener 16 as shown in FIG. 6 corresponds to the circular shape of openings 12 and 26 as discussed above to provide optimal vibrational dampening. Alternately, openings 12 and 26 may take on a rectangular, tri-angular, non-conforming, or other shape. If that is the case, then the peripheral shape of segments 31 and 32 should advantageously be made to conform to the shape of openings 12 and 26. If openings 12 and 26 are substantially square in nature, then the fastener 116 as shown in FIG. 7 should be advantageously employed. Fastener 116 conforms to fastener 16, except that the peripheral shape of the abutment member, the spacer member, and cap member, and the cross-sectional shape of the segments are rectangular, and not circular. In FIG. 7, rectangular counterparts of circular components of fastener 16 are designated by the numerals used in FIG. 6 having 100 added thereto.

Referring now to FIG. 8, fastener 16 is shown in axial alignment with openings 12 and 26 of mounting plate 25 and top plate 20, respectively, blown apart from the mounted position as shown in FIG. 2. As described hereinabove, fastener 16 is sized to secure mounting plate 25 on first segment 31 and top plate 20 of muffin fan 10 on second segment 32 at flange 15 so as to provide acoustic isolation between plates 20 and 25. Acoustic isolation is accomplished by spacing plates 20 and 25 a predetermined distance apart defined by the longitudinal dimension of spacer member 50. This sandwich type of isolation is well known to those skilled in the art and requires the use of a non-metallic material. In the preferred embodiment of the present invention, fasteners 16 are advantageously one-piece members injection molded from ALCRYN ® Melt-Processible Rubber. However, the use of other resilient non-metallic materials, particularly elastomeric materials, is contemplated and within the spirit and scope of the invention. As described above, spacer member 50 has an outer periphery which is sized larger than openings 12 and 16 so as to inhibit passage of member 50 therethrough. Similarly, abutment member 60 has an outer periphery which is sized larger than opening 26 to inhibit passage of abutment member 60 through opening 26 of top plate 20. Members 50 and 60 are sized in this manner to secure plates 25 and 20 on segments 31 and 32, respectively, after fastener 16 has been installed. The method of installation of fastener 16 so as to attach muffin fan 10 to mounting plate 25 in acoustic isolation, will now be described.

First, fastener 16 is passed through opening 12 of mounting plate 25. To accomplish this, fastener 16 is placed in substantial axial alignment with hole 12 of mounting plate 25. In the preferred embodiment, fastener 16 is placed in said alignment by hand. Alternatively, a mechanical assembly member (not shown) may be used to hold and place fastener 16 in said alignment. Those of ordinary skill in the art will recognize that fastener 16 and opening 12 do not have to be placed in exact axial alignment so long as fastener 16 is substantially aligned axially with opening 12 and opening 12 is correspondingly sized large enough to allow fastener 16 to be forced therethrough. The tolerance allowed is typical of prior art procedures and is well known to those of ordinary skill in the art. An axial force F is then applied in the direction shown to move fastener 16 through opening 12 of plate 25 as plate 25 is held in place. Force F may be supplied by hand, but is preferably supplied by assembly tool 79, discussed above. When assembly tool 79 is employed, fastener 16 should be placed proximate opening 12 when placing the fastener in substantial axial alignment therewith so that grip means 70 is accessible to assembly tool 79 through opening 12 or on the side of plate 25 opposite cap member 40. When axial force F is applied, tapered portion 62 of abutment member 60 comes into contact with hole 12 at impact location 66 as indicated in FIG. 8. As force F is further applied, tapered portion 60 deforms into slot 80 as described hereinabove. Slot 80 must be sized large enough to permit circumferential compression of tapered portion 62 into slot 80 so that abutment member 60 can pass through opening 12. As force F is further applied, second segment 32 passes through opening 12. In the preferred embodiment, the outer periphery of segment 32 is sized smaller than opening 12 to allow unimpeded passage of fastener 16 therethrough. However, segment 32 may have an outer periphery sized larger than opening 12 so long as slot 80 is radially incorporated into segment 32 an appropriate corresponding amount to permit circumferential compression thereof into slot 80. As force F is still further applied, spacer member 50 comes into contact with opening 12. Spacer member 50 is inhibited from passing through opening 12 as member 50 has an outer periphery sized larger than opening 12. However, as axial force F is further applied, spacer member 50 will circumferentially compress into slot 80, in the same manner that allowed abutment member 60 to circumferentially compress into slot 80, so that spacer member 50 is able to pass through opening 12 under Force F. As force F is still further applied, fastener 16 passes through opening 12 until cap member 40 comes into contact with plate 25. Cap member 40 has an outer periphery sized larger than opening 12 as discussed above to inhibit passage therethrough. In the preferred embodiment, cap member 40 comes into contact with plate 25 before spacer member 50 has come completely through opening 12. By applying force F slightly thereafter, plate 25 will snugly snap into place against an elastomeric bias provided by cap 40.

The next step is to position plates 25 and 20 in substantially parallel juxtaposition so that opening 12 is in substantial alignment with opening 26 as shown in FIG. 8. Those of ordinary skill in the art will recognize that plates 25 and 20 do not have to be in exact parallel alignment so long as fastener 16 is in substantial axial alignment with openings 12 and 26 and openings 12 and 26 are correspondingly sized large enough to allow fastener 16 to be forced therethrough in a manner similar to that discussed above with respect to the alignment of fastener 16 with opening 12. Plates 25 and 20 are placed in alignment and positioned so that grip means 70 is accessible for engagement with assembly tool 79, preferably by hand. Alternatively, plates 25 and 20 may be so positioned by suitable mechanical means known to those of ordinary skill in the art.

The final step is to again apply axial force F in the direction indicated for passing the abutment member 60 of fastener 16 through opening 26 of plate 20 to secure plate 20 on segment 32 of fastener 16. In the preferred embodiment, plyer-type assembly tool 79 is advantageously employed to engage fastener 16 and supply the required force F. Assembly tool 79 and grip means 70 are preferably formed and shaped to compliment one another as shown in FIG. 4. In this manner, assembly tool 79 provides the axial force F needed to pull abutment member 60 through opening 26 in the manner described herein. When using assembly tool 79, the tool engages grip means 70 at end 73 by means of pivotal tines 90 and 91. As axial force F is further applied abutment member 60 comes into contact with opening 26 at impact point 66. As axial force F is further applied, in a manner similar to that described above, abutment member 60 deforms into slot 80 so that tapered portion 62 is circumferentially compressed into slot 80 to allow passage of abutment member 60 through opening 26. As described above, spacer member 50 has an outer periphery sized larger than opening 26 to inhibit passage therethrough. Therefore, when spacer member 50 comes into contact with plate 20 at flange 15, passage of fastener 16 through opening 26 is inhibited. At this point, axial force F is discontinued and plate 20 is secured on segment 32 of fastener 16 between spacer member 50 and abutment member 60.

Those of ordinary skill in the art will recognize that force F, as used in the steps of passing the fastener through openings 12 and 26, as described hereinabove, may be entirely supplied by means of assembly tool 79. Assembly tool 79 is advantageously adapted to engage grip means 70 and to pull fastener 16 through plates 25 and 20. Those skilled in the art, however, will recognize that force F, as applied in the step of passing the abutment member of the fastener through the opening 26, may alternatively consist of holding plate 20 in place and pushing fastener 16 and/or plate 25 toward plate 20 or may consist of engaging grip means 70 with assembly tool 79, holding assembly tool 79 in place, and pushing plate 20 toward plate 25 until flange 15 of plate 20 comes into contact with a spacer member 50. It is to be understood that the step of positioning plates 25 and 20 may precede the step of passing fastener 16 through opening 12 of mounting plate 25, or may occur at some point during that step, such as after fastener 16 is placed in substantial axial alignment with hole 12 of mounting plate 25 and before force F is applied to move fastener 16 therethrough.

Various modifications of the invention, in addition to those shown and described herein will be apparent to those of ordinary skill in the art from the foregoing description and the accompanying drawings. Such modifications are intended to fall within the scope of the appended claims.

What is claimed is:

1. A fastener for attaching first and second members by means of substantially aligned first and second openings in the respective members to provide acoustic isolation between the members, each opening having a predefined depth and peripheral shape, said fastener comprising:
    a longitudinal shaft portion having first and second segments, said first and second segments having a cross-sectional shape substantially conforming to the a predefined peripheral shape of the first and second openings, respectively, said first and second segments having a longitudinal length substantially conforming to the depth of the first and second openings, respectively;
    a cap member integrally disposed longitudinally at a first end of said shaft portion adjacent and outside of said first segment, said cap member having an outer periphery larger than the first opening to inhibit passage of said cap member therethrough;
    a spacer member positioned longitudinally on said shaft portion between said first and second segments thereof having an outer periphery larger than the first and second openings to inhibit passage therethrough so as to secure the first member on said first segment of said shaft portion between said cap member and said spacer member and to space the first and second members a predetermined distance from each other corresponding to the longitudinal dimension of said spacer member; and
    an abutment member positioned longitudinally on a second end of said shaft portion adjacent and outside of said second segment having an outer periphery larger than the second opening to inhibit passage of said abutment member therethrough so as to secure the second member on said second segment of said shaft portion between said spacer member and said abutment member, said spacer member and said abutment member each having at least one slot therein to permit circumferential compression thereof so as to allow passage of said spacer member and said abutment member through the first and second openings, respectively.

2. An acoustic isolation fastener as claimed in claim 1 wherein said shaft portion is comprised of an elastomeric cylindrical shaft.

3. A fastener as claimed in claim 2 further comprising an axial deformation slot incorporated into said fastener comprising said at least one slot of said spacer member and of said abutment member.

4. A fastener as claimed in claim 3 wherein said deformation slot is further radially incorporated into said second segment of said shaft portion extending from said spacer member to said abutment member.

5. An acoustic isolation fastener as claimed in claim 1 further comprising grip means integral with said second end of said shaft portion to facilitate engagement with an assembly tool.

6. An acoustic isolation fastener as claimed in claim 5 wherein said grip means comprises an annular pull cone having relatively larger and smaller ends each sized to pass through the first and second openings.

7. An acoustic isolation fastener as claimed in claim 1 wherein said shaft portion is comprised of an elastomeric rectangular shaft.

8. An acoustic isolation fastener as claimed in claim 1 wherein said abutment member comprises an annular locking cone having relatively larger and smaller ends, said smaller end being positioned outside of said larger end and having an outer periphery sized smaller than the first and second openings to allow passage therethrough, said larger end being having an outer periphery sized larger than the second opening to inhibit passage therethrough.

9. An acoustic isolation fastener as claimed in claim 8 wherein said shaft portion is comprised of a one-piece elastomeric cylindrical shaft.

10. An acoustic isolation fastener as claimed in claim 9 further comprising an axial deformation slot incorporated into said shaft portion, said slot comprising said at least one slot of said spacer member and of said abutment member.

11. An acoustic isolation fastener as claimed in claim 10 wherein said deformation slot is further radially incorporated into said second segment of said shaft portion, extending from said spacer member to said annular locking cone.

12. A fastener as claimed in claim 1, the first member having a plurality of first openings, the second member having a corresponding plurality of second openings, wherein said fastener comprises a plurality of substantially identical fasteners corresponding to the number of said plurality of first openings, the first openings spaced a predetermined distance apart to support the second member to the first member.

13. A fastener as claimed in claim 12 wherein said plurality of substantially identical fasteners comprises four substantially identical fasteners.

14. A fastener as claimed in claim 1 wherein the first and second members are substantially planar.

15. A fastener as claimed in claim 14 wherein the first and second members are positioned in substantially parallel juxtaposition.

* * * * *